US009600653B2

(12) United States Patent
Cheng et al.

(10) Patent No.: US 9,600,653 B2
(45) Date of Patent: *Mar. 21, 2017

(54) PROVIDING TIME RATIO-BASED PASSWORD/CHALLENGE AUTHENTICATION

(71) Applicant: International Business Machines Corporation, Armonk, NY (US)

(72) Inventors: Yun-Ling Hilary Cheng, Taipei (TW); William Hsin-Wei Fu, Taipei (TW); Min-Tsung Wu, Taipei (TW); Tony Ping-Chung Yang, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/470,554

(22) Filed: Aug. 27, 2014

(65) Prior Publication Data

US 2014/0373119 A1 Dec. 18, 2014

Related U.S. Application Data

(62) Division of application No. 13/624,127, filed on Sep. 21, 2012, now Pat. No. 8,826,029.

(30) Foreign Application Priority Data

Sep. 30, 2011 (TW) .............................. 100135801 A (51) Int. Cl.
*G06F 7/04* (2006.01)
*G06F 21/45* (2013.01)
(Continued)

(52) U.S. Cl.
CPC .............. *G06F 21/45* (2013.01); *G06F 21/31* (2013.01); *G06F 21/32* (2013.01); *H04L 9/3226* (2013.01);
(Continued)

(58) Field of Classification Search
CPC . H04L 63/0846; H04L 9/3226; H04L 63/083; H04L 63/0838; G06F 21/316; G06F 21/32
(Continued)

(56) References Cited

U.S. PATENT DOCUMENTS 4,621,334 A * 11/1986 Garcia .......................... 382/115
4,805,222 A * 2/1989 Young et al. ................. 382/115
(Continued)

FOREIGN PATENT DOCUMENTS

CN 101344825 A 1/2009
CN 201210311 3/2009
(Continued)

OTHER PUBLICATIONS

U.S. Appl. No. 13/624,127, Non-Final Office Action, Oct. 3, 2013, 14 pg.
(Continued)

*Primary Examiner* — Samson Lemma
(74) *Attorney, Agent, or Firm* — Cuenot, Forsythe & Kim, LLC (57) ABSTRACT

Providing registration for password/challenge authentication includes receiving an access code or pattern inputted by a user, recording a time message associated with each component of the access code or pattern via a processor, generating a data record in combining each component of the access code or pattern with the associated time message, and storing the data record.

21 Claims, 5 Drawing Sheets

(51) Int. Cl.
*G06F 21/32* (2013.01)
*H04L 9/32* (2006.01)
*G06F 21/31* (2013.01)
*H04L 29/06* (2006.01)

(52) U.S. Cl.
CPC ........ *H04L 63/083* (2013.01); *H04L 63/0846* (2013.01); *G06F 21/316* (2013.01); *H04L 63/0838* (2013.01)

(58) Field of Classification Search
USPC .................. 726/2, 4, 5–7; 713/168, 182–184
See application file for complete search history.

(56) References Cited

U.S. PATENT DOCUMENTS

| | | | |
|---|---|---|---|
| 6,442,692 B1 * | 8/2002 | Zilberman | 713/184 |
| 6,522,729 B2 | 2/2003 | Pinard et al. | |
| 6,954,862 B2 * | 10/2005 | Serpa | 726/5 |
| 7,305,559 B2 * | 12/2007 | Schreiber | G06F 21/316 |
| | | | 382/115 |
| 7,593,000 B1 | 9/2009 | Chin | |
| 7,653,818 B2 * | 1/2010 | Serpa | 713/184 |
| 8,332,932 B2 * | 12/2012 | Kellas-Dicks | G06F 21/316 |
| | | | 713/186 |
| 8,826,029 B2 | 9/2014 | Cheng et al. | |
| 2004/0054929 A1 * | 3/2004 | Serpa | 713/202 |
| 2004/0143767 A1 | 7/2004 | Scheiber et al. | |
| 2005/0273624 A1 * | 12/2005 | Serpa | 713/183 |
| 2006/0075250 A1 | 4/2006 | Liao | |
| 2009/0149156 A1 | 6/2009 | Yeo | |
| 2009/0289916 A1 | 11/2009 | Dai | |
| 2010/0162182 A1 | 6/2010 | Oh et al. | |
| 2010/0225443 A1 | 9/2010 | Bayram et al. | |
| 2011/0261000 A1 * | 10/2011 | Batara | 345/173 |
| 2012/0144460 A1 * | 6/2012 | Raisch | H04L 9/002 |
| | | | 726/5 |
| 2013/0086666 A1 | 4/2013 | Cheng et al. | |
| 2013/0104227 A1 * | 4/2013 | Dow et al. | 726/19 |

FOREIGN PATENT DOCUMENTS

| | | |
|---|---|---|
| CN | 101557287 A | 10/2009 |
| CN | 102142071 A | 8/2011 |
| TW | 201315195 A1 | 4/2013 |
| TW | 474703 B | 2/2015 |
| WO | 2008136551 A1 | 11/2008 |
| WO | 2010049397 A1 | 5/2010 |
| WO | 2010083747 A1 | 7/2010 |

OTHER PUBLICATIONS

U.S. Appl. No. 13/624,127, Notice of Allowance, Apr. 25, 2014, 7 pg.

* cited by examiner

PROVIDING TIME RATIO-BASED PASSWORD/CHALLENGE AUTHENTICATION

CROSS-REFERENCE TO RELATED APPLICATIONS

This application claims the right of priority based on Taiwan Patent Application No. 100135801, entitled "Method and Computer System For Providing Time Ratio-Based Password/Challenge Authentication", filed on Sep. 30, 2011. The entire content of the aforementioned application is incorporated herein by reference. This application is a Division of U.S. application Ser. No. 13/624,127, filed on Sep. 21, 2012.

BACKGROUND

Daily life requires the use of a wide variety of information devices, such as mobile phones, personal computers, notebook computers, and tablet computers. The information devices may keep users' personal data and identity data. Due to the prevalence of networks, an increasing number of network functions are performed on-line. In particular, servers have to store users' personal data and identity data in order to provide network services, such as social networking services, webpage/email services, mobile commerce services, banking on-line transaction services, database access services, or content and information provider services. Hence, to ensure security and privacy, the servers usually require that, before accessing the services provided by the servers, users have to follow an authentication procedure for recognizing the users' identity. At present, one of the most common authentication procedures is a password-based challenge authentication procedure whereby a server typically requires that, before accessing its services, users ought to enter a username and a password for identity recognition (or known as "login"), in order to prevent user personal data from being stolen or fraudulently changed.

With network coverage and accessibility increasing rapidly, hackers are becoming more likely to target a user's password with a view to faking the user's identity. Therefore, simple passwords no longer provide adequate protection; in view of this, various mechanisms are put forth to provide better protection. For example, users are required to create a password that meets the requirements of password length, complexity, and unpredictability, such that the strength of the password is sufficient to fend off brute-force search attacks and dictionary attacks. Furthermore, users are required to change their passwords regularly to invalidate old passwords, thereby reducing the chance that their passwords will be cracked. The aforesaid mechanisms enhance security and thus help users protect their accounts.

Figure 1:
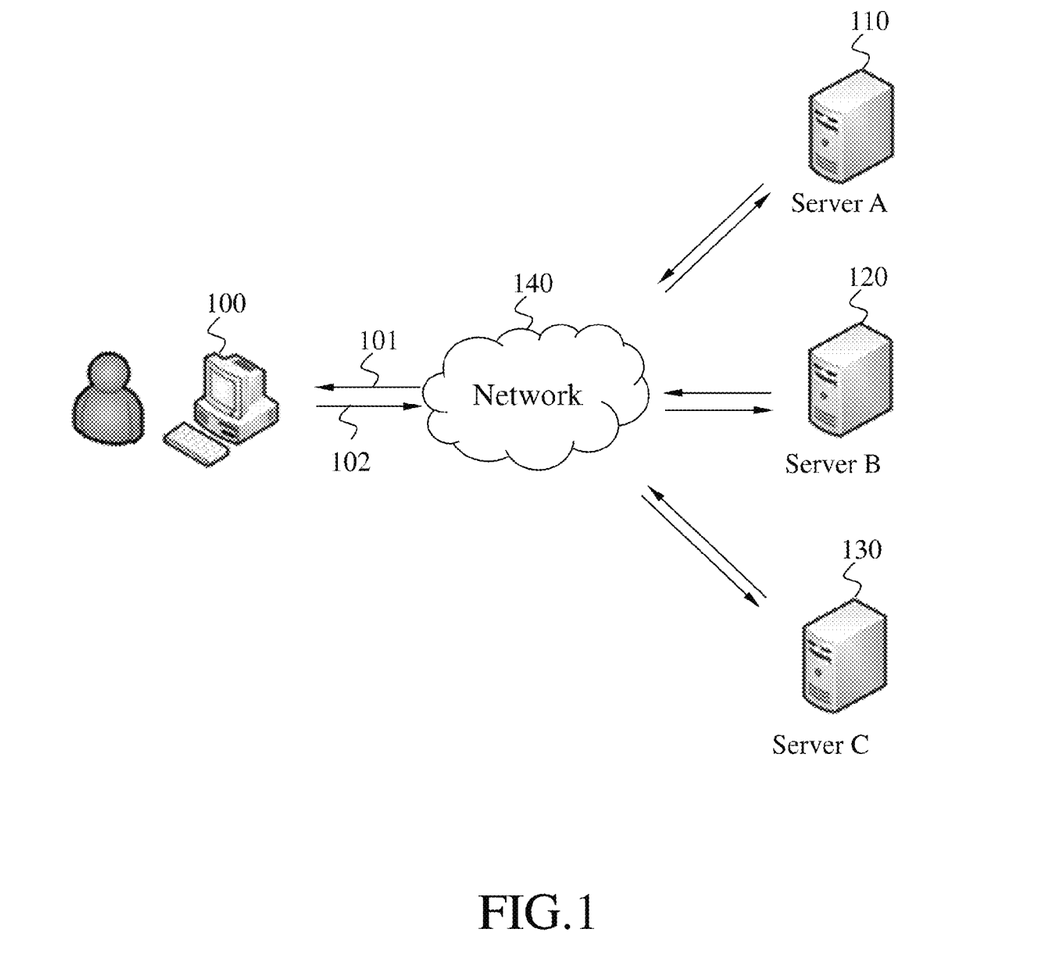
FIG. 1 illustrates a schematic view of a conventional system for password/challenge authentication.

However, referring to FIG. 1, a client end 100 requests access to different web services and an authentication procedure of a username/password 102 provided by website A 110, website B 120, and website C 130 through a network 140 by means of a challenge 101. In practice, most users usually use different usernames/passwords to log in website A 110, website B 120, and website C 130, respectively. The mechanisms require users to memorize passwords for accessing the web services of different websites, respectively. Furthermore, users usually log in a small number of websites on a daily basis, and thus are unlikely to memorize accurately the passwords of those websites which are seldom visited by them; hence, they have to guess the rarely-used passwords, not to mention that their accounts would be locked out after incorrect password entries.

Therefore, there is a need to assist users in memorizing troublesome passwords while ensuring security. A solution lies in conventional one-time password (OTP) technology. However, OTP technology can provide passwords to users only when additional technology is accessible. In most circumstances, OTP technology requires an electronic device. Chances are the electronic device will get lost, and thus the risk of losing the passwords is always there. Furthermore, it is unlikely for an organization to share its OTP generation mechanism with another organization; hence, to access web services provided by different websites, respectively, a user has to use their respective electronic devices. Therefore, users have to carry multiple portable electronic devices, thereby adding to a loss risk.

Another solution is provided by a password hint mechanism. However, the mechanism works at the cost of undermining password security, because unauthorized persons can also see the password hint and therefore help a hacker crack the password. Furthermore, the mechanism is not effective in giving an appropriate password hint to a complicated password. Therefore, sensitive systems nowadays seldom use the mechanism.

Lots of methods for providing a more secure password-based challenge have been proposed, one of which can be referred to U.S. Pat. No. 7,653,818, which is incorporated herein by its entirety. It disclosed a method of incorporating password with a timing factor, such as time limit of keystrokes, a predetermined length of pause between keystrokes, etc., to enhance security and prevent unauthorized access.

BRIEF SUMMARY

An embodiment can include a method of providing registration for password/challenge authentication. The method includes receiving an access code or pattern inputted by a user, recording a time message associated with each component of the access code or pattern using a processor, generating a data record in combining each component of the access code or pattern with the associated time message, and storing the data record.

Another embodiment can include a method. The method includes calculating a beat ratio from a first ending component of a stored access code or pattern and of a user-inputted access code or pattern using a processor, transforming each component of the stored access code or pattern by means of the beat ratio, calculating an acceptable beat range by means of a predetermined acceptable threshold, and determining whether, within the acceptable beat range, each component of the user-inputted access code or pattern matches the corresponding component of the stored access code or pattern.

Another embodiment can include a system. The system includes a processor configured to initiate executable operations for providing registration for time ratio based password/challenge authentication. The executable operations include receiving an access code or pattern inputted by a user, recording a time message associated with each component of the access code or pattern, generating a data record in combining each component of the access code or pattern with the associated time message, and storing the data record.

Another embodiment can include a system. The system includes a processor configured to initiate executable operations for providing login for time ratio based password/ challenge authentication. The executable operations include calculating a beat ratio from a first ending component of a stored access code or pattern and of a user-inputted access code or pattern, transforming each component of the stored access code or pattern by means of the beat ratio, calculating an acceptable beat range by means of a predetermined acceptable threshold, and determining whether, within the acceptable beat range, each component of the user-inputted access code or pattern matches the corresponding component of the stored access code or pattern.

Another embodiment can include a computer program product for providing registration for password/challenge authentication. The computer program product includes a computer-readable storage medium having stored thereon program code that, when executed, configures a processor to perform executable operations. The executable operations include receiving an access code or pattern inputted by a user, recording a time message associated with each component of the access code or pattern, generating a data record in combining each component of the access code or pattern with the associated time message, and storing the data record.

BRIEF DESCRIPTION OF THE SEVERAL VIEWS OF THE DRAWINGS

In order for the advantages of the embodiments of the invention to be readily understood, a more particular description of the embodiment of the invention briefly described above will be rendered by reference to specific embodiments that are illustrated in the appended drawings. Understanding that these drawings depict only typical embodiments of the invention and are not, therefore, to be considered to be limiting of its scope, the invention will be described and explained with additional specificity and detail through the use of the accompanying drawings. In the drawings.

DETAILED DESCRIPTION

Embodiments of the present invention relate to a mechanism for password-based challenge authentication, and more particularly, to a method for dynamically providing time ratio-based password/challenge authentication and a computer system using the method.

Reference throughout this specification to features, advantages, or similar language does not imply that all of the features and advantages that may be realized with the embodiments of the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the embodiments of the invention may be practiced without one or more of the specific features or advantages of a particular embodiment. In other instances, additional features and advantages may be recognized in certain embodiments that may not be present in all embodiments of the invention.

In view of the foregoing, one aspect of the present invention is to provide a novel password-based challenge mechanism to identify the user's identity. In addition to the password input sequence, the mechanism also considers keystroke time, pause time between keystrokes, and rhythm, tempo, or beat of entry as a part of the password. In addition to time associated factors, the embodiments of the present invention also consider the tempo of entering password (or referred to as access code) (or pattern inputted through touch screen) to perform a so-called time ratio-based password/ challenge authentication method of the present invention. That is, passwords being entered according to different tempo (faster or slower) will be considered as the same password.

Furthermore, the embodiments of the present invention also allow multi-key or multi-touch input as a part of the password to provide a function similar to play on a musical instrument. Accordingly, the embodiments of the present invention are applicable to a variety of input devices, such as keyboard, touch screen, mouse, etc. The user can press the key "A" and the key "B" simultaneously or click the left button and the right button of the mouse simultaneously to serve as a part of the password.

Since the embodiments of the present invention can combine rhythm, pace, or beat and tempo as a part of the password, it is possible to build a more user-friendly and easy memorable password. Moreover, the present invention can also combine audio or visual aides to assist the user in memorizing the password. For example, when entering the password, musical instrument sounds, such as the musical sounds played on pianos or flutes, corresponding to the entering tempo of the password can be provided as a prompt to the user. For touch screen input, it is possible to combine virtual keyboards or simulated piano keyboards to facilitate the entering of password by the user. These kinds of mechanisms increase the complexity of password, thus enhancing security with easy memorable characteristic.

In accordance with one embodiment, a method of providing registration for time ratio based password/challenge authentication is provided. The method includes: receiving an access code or pattern inputted by a user; recording a time message associated with each component of the access code or pattern; generating a data record in combining each component of the access code or pattern with the associated time message; and storing the data record.

In accordance with another embodiment, a method of providing login for time ratio based password/challenge authentication is provided. The method includes: calculating a beat ratio from a first ending component of a stored access code or pattern and of a user-inputted access code or pattern; transforming each component of the stored access code or pattern by means of the beat ratio; calculating an acceptable beat range by means of a predetermined acceptable threshold; and determining whether, within the acceptable beat range, each component of the user-inputted access code or pattern matches the corresponding component of the stored access code or pattern.

In accordance with another embodiment, a computer system providing registration for time ratio based password/challenge authentication is provided. The computer system includes: a host, the host including: a system bus; a memory connected to the system bus, wherein the memory comprises a set of commands; and a processing unit connected to the system bus, wherein the processing unit executes the set of commands to perform the method of registration described above.

In accordance with another embodiment, a computer system for providing login for time ratio based password/challenge authentication is provided. The computer system includes: a host, the host including: a system bus; a memory connected to the system bus, wherein the memory comprises a set of commands; and a processing unit connected to the system bus, wherein the processing unit executes the set of commands to perform the method of login described above.

The following description, the appended claims, and the embodiments of the present invention further illustrate the features and advantages disclosed within this specification.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the embodiments of the present invention may be embodied as a computer device, a method or a computer program product. Accordingly, the embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

One or more embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 5, computer devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer System

Figure 2:
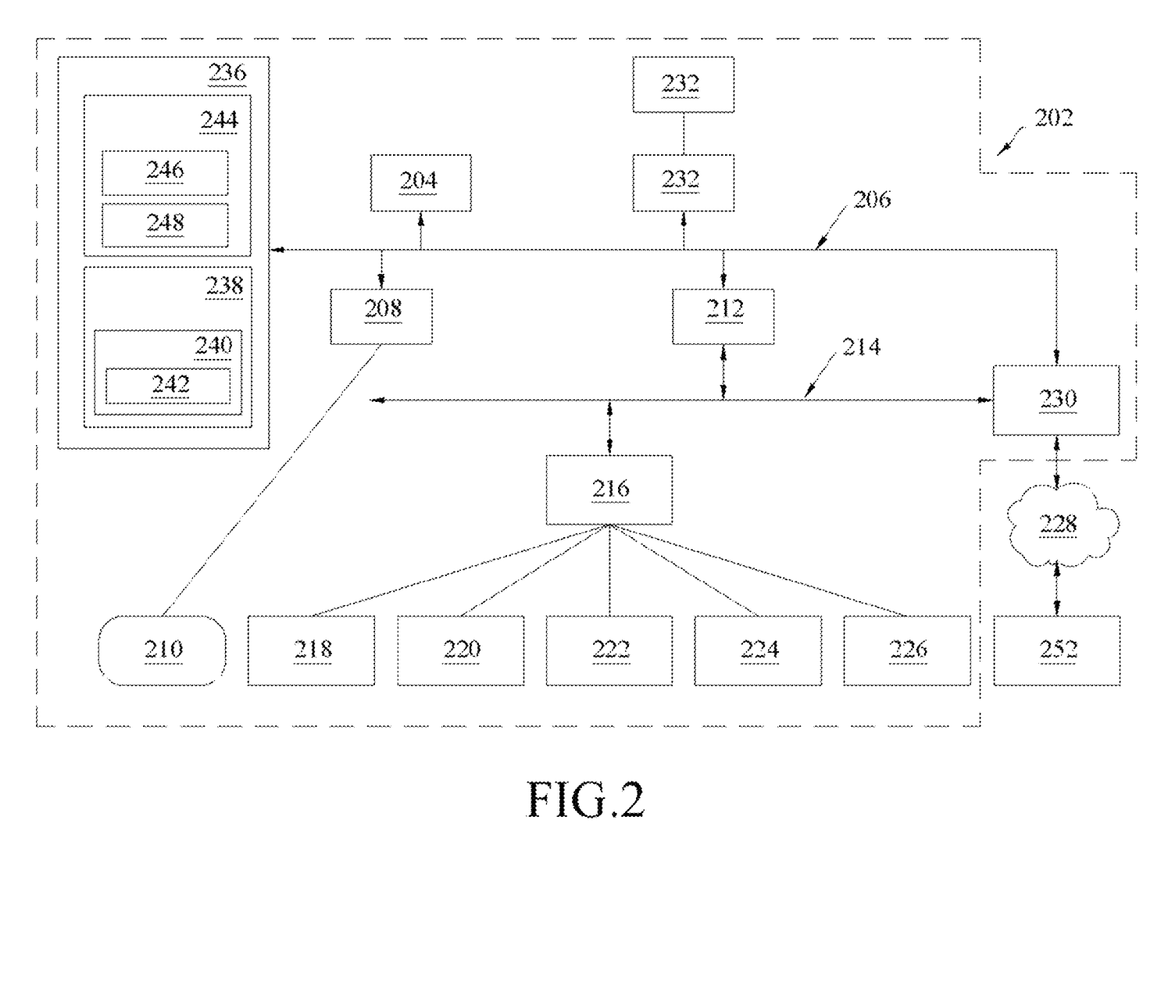
FIG. 2 illustrates a block diagram of a hardware environment of the exemplary client computer in accordance with one embodiment of the present invention.

FIG. 2 is a block diagram of an illustrative hardware environment of a client computer 202 according to an embodiment of the present invention. In an exemplary embodiment, a server is a universal desktop computer including: a processor for executing various applications; a storage device for storing various information and program code; a display device, a communication device, and an input/output device which function as interfaces for communicating with a user; and a peripheral component or other components serving a specific purpose. In another embodiment, the present invention is implemented in another way and thus having less or more other devices or components. The network can also be implemented in any form of a connection, including a fixed connection, such as a local area network (LAN) or a wide area network (WAN), or getting connected to the Internet through a dial-up connection provided by an Internet service provider (ISP). The network connection is not restricted to cable connection and wireless connection; instead, it can also be implemented by wireless connection in the form of a GSM connection or a Wi-Fi connection for communicating with a client computer. The network further includes other hardware and software components (not shown), such as an additional computer system, router, and firewall.

As shown in FIG. 2, a client computer 202 includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read Only Memory (CD-ROM) 222, a floppy disk drive 224, and a flash drive memory 226. The format of the ports connected to I/O interface 216 may be any known to those skilled in the art of computer architecture, including but not limited to Universal Serial Bus (USB) ports.

The client computer 202 is able to communicate with a service provider server 252 via a network 228 using a network interface 230, which is coupled to system bus 206. Network 228 may be an external network such as the Internet, or an internal network such as an Ethernet or a Virtual Private Network (VPN). Using network 228, the client computer 202 is able to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes client computer 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, one or more embodiments of the present invention will equally well support other user interface modes, such as graphical, voice, gestural, etc. As depicted, OS 238 also includes kernel 242, which includes lower levels of functionality for OS 238, including providing essential services required by other parts of OS 238 and application programs 244, including memory management, process and task management, disk management, and mouse and keyboard management.

The hardware framework of a server 252 is identical or similar to that of the client computer 202, or is any conventional basic framework, and the embodiments of the present invention is not limited thereto. For example, the server is a desktop computer, a notebook computer, a personal digital assistant (PDA), or a smartphone. However, FIG. 2 and the above examples are not restrictive of the one or more embodiments of the present invention. The client computer 202 includes a browser. The browser includes a program module and instructions. The program module and commands comply with the Hypertext Transfer Protocol (HTTP) whereby a World Wide Web (WWW) client (i.e., the client computer 202) sends and receives web-based messages through the Internet, thereby effectuating communication with the server 252.

An application 244 includes a password-based challenge module 246 of the embodiments of the present invention. The password-based challenge module 246 includes a program module and commands. The program module and commands can communicate with the server 252, so as to recognize a user's identity. The password-based challenge module 246 is a module in the application, or is implemented in the form of a daemon. In another embodiment, the password-based challenge module 246 is implemented as a program in another form. The password-based challenge module 246 includes a code for executing the procedures described below and depicted with FIG. 3 and FIG. 5.

The hardware elements depicted in the client computer 202 are not intended to be exhaustive, but rather are representative to highlight essential components required by the embodiments of the present invention. For instance, client computer 202 may include alternate memory storage devices such as magnetic cassettes, Digital Versatile Disks (DVDs), Bernoulli cartridges, and the like. These and other variations are intended to be within the spirit and scope of the present invention.

Password/Challenge Authentication Procedure

Figure 3:
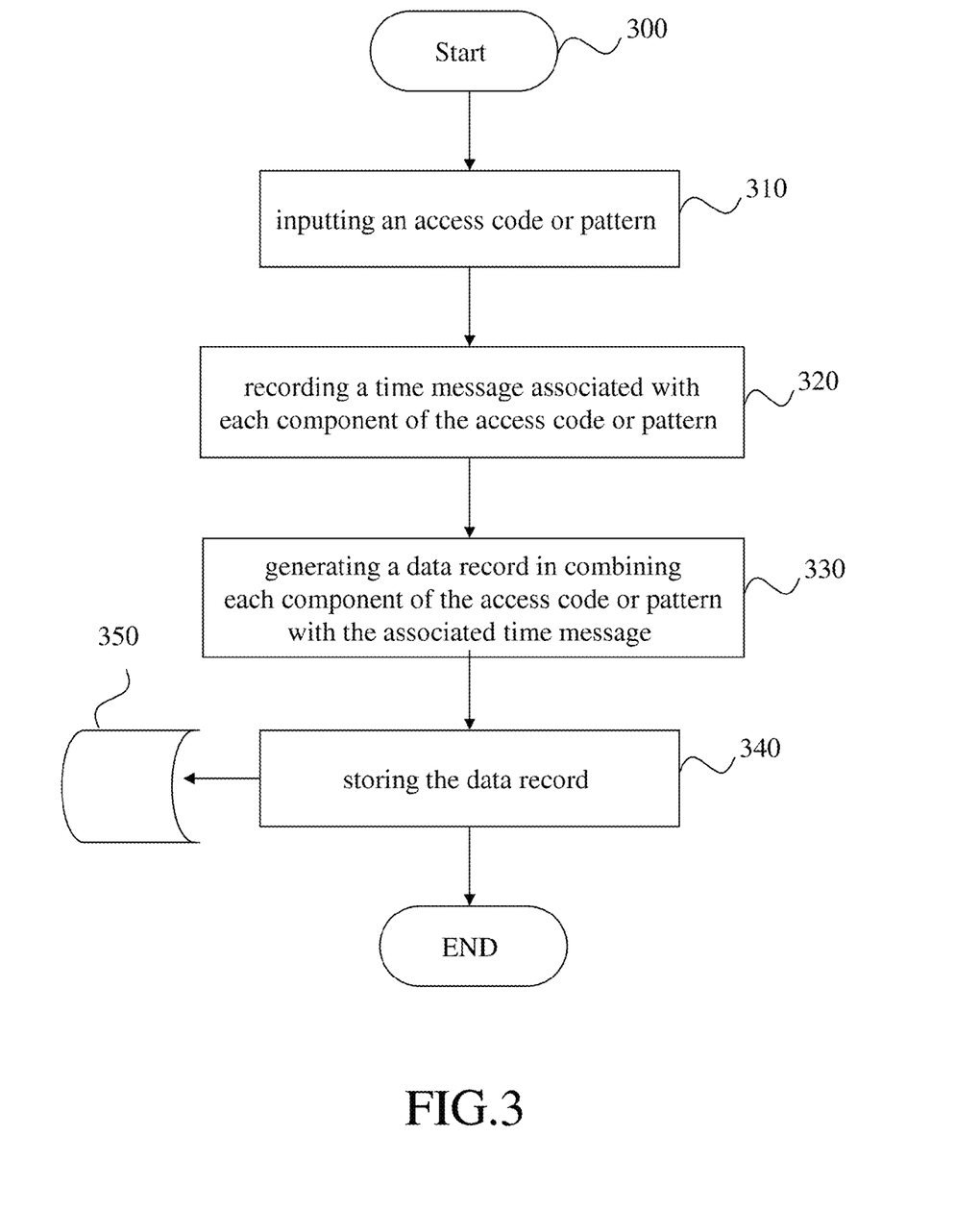
FIG. 3 illustrates a flowchart of a method of providing registration for password/challenge authentication in accordance with one embodiment of the present invention.
Figure 4:
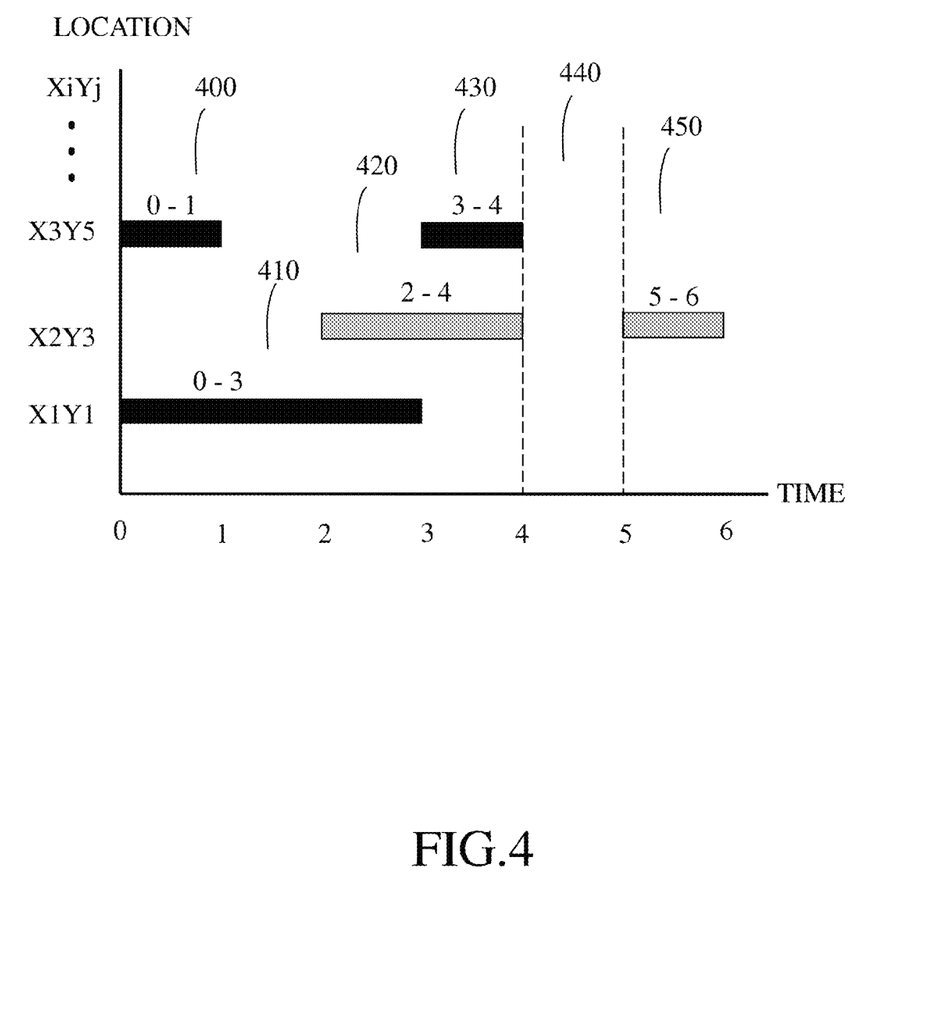
FIG. 4 illustrates a diagram showing the relationship between location of each component of password or pattern and time.
Figure 5:
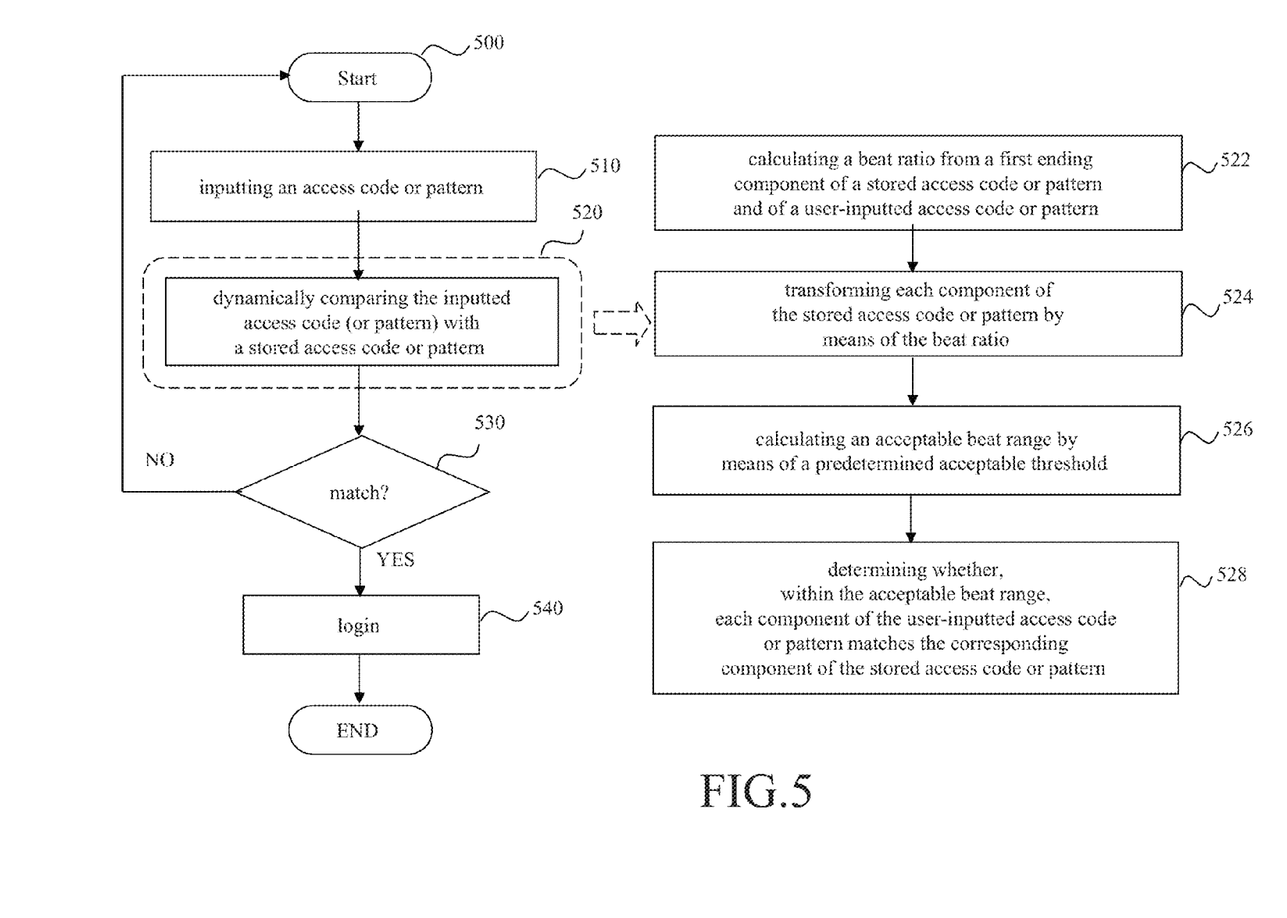
FIG. 5 illustrates a flowchart of a method of providing login for password/challenge authentication in accordance with one embodiment of the present invention.

FIG. 3 and FIG. 5 in combination with FIG. 4 illustrate method steps of the password-based challenge module of the present invention.

FIG. 3 is a flowchart of a method of providing registration for password/challenge authentication in accordance with one embodiment of the present invention.

Step 310: receiving an account number and a password inputted by a user (or pattern inputted through a touch screen).

Step 320: recording a time message associated with each component of the password (or pattern). When inputting through keyboard, said each component is each keystroke character of the password entered. When inputting through touch screen, said each component is each keystroke or each stroke of the password entered through a virtual keyboard or a simulated piano keyboard. More details are described later with reference to FIG. 4.

Step 330: generating a data record in combining each component of the password (or pattern) with the associated time message.

Step 340: storing the data record in a password database 350.

It is noted that some authentication mechanisms do not include user account number, only request for password to authorize access. For example, such authentication mechanisms include PIN input or power-on or unlock password input of mobile phones or mobile devices (e.g. tablet computers such as iPad®).

FIG. 4 illustrates a diagram showing the relationship between the location of each component of password or pattern and time. When the user intends for registration of password, each component of the password or pattern can be recorded in the following format: [starting time, ending time, XY coordinates]. As shown in FIG. 4, if the user inputs a password in total six seconds, it will be recorded and stored in the password database 350 as: [0, 1, X3Y5]400, [0, 3, X1Y1]410, [2, 4, X2Y3]420, [3, 4, X3Y5]430, [4, 5, REST] 440, [5, 6, X2Y3]450, wherein [0, 3, X1Y1]410 means coordinates (X1Y1) is pressed at timing 0 for 3 seconds. Furthermore, [4, 5, REST]440 means no key is pressed (or no position is touched through the touch screen) at the fourth second for 1 second. That is, the time for REST also constitutes a part of the password. The complexity of password is increased with the recordation of the time period for REST. Therefore, the establishment of password is not only about what is inputted but also relates to the recordation of nothing is inputted. The time record can be implemented just through the input from a conventional keyboard (or through the touch point of the touch screen), and simultaneously, the timing of touch and the timing of leaving the input device of the computer system can also be read based on the internal clock. It is noted that the password database can be located in a local computer device or a remote server; the present invention is not limited thereto.

When the user intends to login and inputs the password, the time of duration of the first ending component in the password or pattern can serve as a base, which is compared with the duration of time of a corresponding component of the password or pattern stored in the database 350 to calculate a beat ratio, R. The product of the duration of time of other component of the password multiplied by the beat ratio constitutes the corresponding time of the component of the password entered by the user, i.e. [0R, 1R, X3Y5], [0R, 3R, X1Y1], [2R, 4R, X2Y3], [3R, 4R, X3Y5], [4R, 5R, REST], [5R, 6R, X2Y3]. An acceptable range of the beat ratio is further calculated by means of a predetermined acceptable threshold. Therefore, in one or more embodiments of the present invention, passwords entered in a same input sequence and according to an input beat within the predetermined acceptable threshold range are considered as the same password and the login will be granted. For example, according to the present invention, the sequential input of "Do<press for 4 seconds>", "<pause for 2 seconds>", Re<press for 4 seconds>", <pause for 2 seconds>", "Mi<press for 4 seconds> is considered the same as the input of "Do<press for 2 seconds>", "<pause for 1 second>", "Re<press for 2 seconds>", "<pause for 1 second>", "Mi<press for 2 seconds>". That is, the passwords entered according to different tempo (slower or faster) are considered as the same password.

From FIG. 4, it can be seen that the embodiments of the present invention also allows multi-key or multi-touch input to provide a function similar to playing on a musical instrument. Therefore, the embodiments of the present invention are applicable to various types of input devices, such as keyboard, touch screen, mouse, etc. The user can press the key "A" and the key "B" simultaneously or click the left button and the right button of the mouse simultaneously to serve as a part of the password.

Moreover, the embodiments of the present invention can also combine audio or visual aides to assist the user in memorizing the password. For example, when entering the password, musical instrument sounds, such as the musical sounds played on pianos or flutes, corresponding to the entering tempo of the password can be provided as a prompt to the user. For touch screen input, it is possible to combine virtual keyboard or simulated piano keyboard to facilitate the entering of password by the user. The use of application module of simulated flute (e.g. App on the iPhone) to facilitate the input of password is also possible. By means of flute sounds from the microphone of information devices, it is possible to facilitate the input of password during some circumstances such as unlock before driving. These kinds of mechanisms increase the complexity of password, thus enhancing security with easy memorable characteristic.

FIG. 5 illustrates a flowchart of a method of providing login for password/challenge authentication in accordance with one embodiment of the present invention. FIG. 5 is incorporated with FIG. 4 to show the method steps of login of one or more embodiments of the present invention.

Step 510: a user inputting a password (or pattern) for login.

Step 520: dynamically comparing the inputted password (or pattern) with a stored password or pattern. The step 520 is further explained below.

Step 522: calculating a beat ratio, R, from a first ending component of the stored password or pattern and of the user-inputted password or pattern.

Step 524: transforming each component of the stored access code or pattern by means of the beat ratio. That is, the time of duration of each component of the access code is multiplied by the beat ratio, R, to constitute a corresponding time of the component of the password subsequently entered by the user. For example, the user enters the password with a faster tempo, wherein the first input is [0, 0.5, X3Y5]400. If the beat ratio R is 0.5 (i.e. R=0.5), the subsequent password components must match this beat ratio. Therefore, [0R, 3R, X1Y1] will become [0, 1.5, X1Y1]410. The entire password must be transformed, in accordance with the beat ratio, into a new password.

Step 526: calculating an acceptable beat range by means of a predetermined acceptable threshold.

Step 528: determining whether, within the acceptable beat range, each component of the user-inputted password or pattern matches the corresponding component of the stored password or pattern.

Step 530: granting login access if each component of the user-inputted access code or pattern matches the corresponding component of the stored access code or pattern (Step 540).

It is noted that in the disclosure of the embodiments disclosed herein, when the multi-key or multi-touch input through a touch screen is supported, the password can be entered at any desirable location on the touch screen. From FIG. 4, it can be seen that the password-based challenge module 246 can analyze the difference in vector coordination of each point, such as from X1Y1 to X2Y3 to X3Y5, and calculate the slope and the angle of each vector. Since each component utilizes a relative vector coordination system, it is possible to enter the password at any location on the touch screen. Different from the conventional password input on the touch screen, the present invention allows the user to input the password without looking at the screen if each component of the password has a correct relative vector coordinate. In sum, the embodiments of the present invention not only consider the password input sequence of the conventional password-based challenge mechanism, but also considers the recordation of input time required for each component, the pause time between keystrokes, and the beat ratio R calculated from the overall keystroke input as a part of the password. Therefore, the password-based challenge module 246 not only considers the password input sequence, but also considers the beat and its beat ratio, instead of the actual time as in U.S. Pat. No. 7,653,818.

Furthermore, the embodiments of the present invention are also applicable to a wide variety of information devices which are not Web-based, such as mobile phones, personal computers, notebook computers, and tablet computers. The information devices keep users' personal data and identity data, and thus can also provide single-machine application by means of a password-based challenge module of the present invention. The password-based challenge module 246 can be a module in an application; however, in another embodiment, it can also be implemented as a program in another form, for example, being integrated into an operating system level and adapted to challenge a user when starting the operating system.

The foregoing preferred embodiments are provided to illustrate and disclose the technical features of the embodiments of the present invention, and are not intended to be restrictive of the scope of the embodiments of the present invention. Hence, all equivalent variations or modifications made to the foregoing embodiments without departing from the spirit embodied in the disclosure of the embodiments of the present invention should fall within the scope of the embodiments of the present invention as set forth in the appended claims.

What is claimed is:

1. A method of providing registration for password/challenge authentication, comprising:
   receiving an access code or pattern inputted by a user;
   recording a time message associated with each component of the access code or pattern using a hardware processor;
   generating, by the hardware processor, a data record in combining each component of the access code or pattern with the associated time message;
   storing the data record; and
   calculating a beat ratio from a first ending component of a stored access code or pattern within the stored data record and of a user-inputted access code or pattern.

2. The method of claim 1, wherein receiving the access code or pattern inputted by the user further comprises receiving a user account number.

3. The method of claim 1, wherein the access code or pattern is recorded in a format of [starting time, ending time, XY coordinates].

4. The method of claim 1, wherein the component of the access code or pattern includes a pause time.

5. The method of claim 1, wherein the user input allows a multi-key or multi-touch input to provide a function.

6. The method of claim 1, further combining an audio or visual aide to assist in memorizing the access code, wherein when entering the access code, musical sounds of a musical instrument with a tempo corresponding to the entering of the access code is provided.

7. The method of claim 1, wherein the access code or pattern inputted by the user can be inputted through a keyboard or a touch screen, wherein the touch screen can combine a virtual keyboard or a simulated musical instrument for the user to input password.

8. A system comprising:
   a hardware processor configured to initiate executable operations for providing registration for time ratio based password/challenge authentication, the executable operations comprising:
   receiving an access code or pattern inputted by a user;
   recording a time message associated with each component of the access code or pattern;
   generating a data record in combining each component of the access code or pattern with the associated time message;
   storing the data record; and
   calculating a beat ratio from a first ending component of a stored access code or pattern within the stored data record and of a user-inputted access code or pattern.

9. The system of claim 8, wherein receiving the access code or pattern inputted by the user further comprises receiving a user account number.

10. The system of claim 8, wherein the access code or pattern is recorded in a format of [starting time, ending time, XY coordinates].

11. The system of claim 8, wherein the component of the access code or pattern includes a pause time.

12. The system of claim 8, wherein the user input allows a multi-key or multi-touch input to provide a function.

13. The system of claim 8, further combining an audio or visual aide to assist in memorizing the access code, wherein when entering the access code, musical sounds of a musical instrument with a tempo corresponding to the entering of the access code is provided.

14. The system of claim 8, wherein the access code or pattern inputted by the user can be inputted through a keyboard or a touch screen, wherein the touch screen can combine a virtual keyboard or a simulated musical instrument for the user to input password.

15. A computer program product for providing registration for password/challenge authentication, the computer program product comprising:
   a computer-readable storage device having stored thereon program code that, when executed, configures a processor to perform executable operations comprising:
   receiving an access code or pattern inputted by a user;
   recording a time message associated with each component of the access code or pattern;
   generating a data record in combining each component of the access code or pattern with the associated time message;

storing the data record; and calculating a beat ratio from a first ending component of a stored access code or pattern within the stored data record and of a user-inputted access code or pattern.

16. The computer program product of claim 15, wherein receiving the access code or pattern inputted by the user further comprises receiving a user account number.

17. The computer program product of claim 15, wherein the access code or pattern is recorded in a format of [starting time, ending time, XY coordinates].

18. The computer program product of claim 15, wherein the component of the access code or pattern includes a pause time.

19. The computer program product of claim 15, wherein the user input allows a multi-key or multi-touch input to provide a function.

20. The computer program product of claim 15, further combining an audio or visual aide to assist in memorizing the access code, wherein when entering the access code, musical sounds of a musical instrument with a tempo corresponding to the entering of the access code is provided.

21. The computer program product of claim 15, wherein the access code or pattern inputted by the user can be inputted through a keyboard or a touch screen, wherein the touch screen can combine a virtual keyboard or a simulated musical instrument for the user to input password.

\* \* \* \* \*